United States Patent [19]

Visnic et al.

[11] Patent Number: 4,744,382
[45] Date of Patent: May 17, 1988

[54] COMBINATION THERMAL OR PRESSURE ACTIVATED RELIEF VALVE

[75] Inventors: James E. Visnic; Kevin M. Johnston, both of West Lafayette, Ind.

[73] Assignee: Aluminum Company of America, Pittsburgh, Pa.

[21] Appl. No.: 43,955

[22] Filed: Apr. 29, 1987

[51] Int. Cl.$^4$ ............................................. F16K 17/14
[52] U.S. Cl. .................... 137/68.1; 137/73; 137/74; 220/89 A; 220/89 B
[58] Field of Search ........................... 220/89 A, 89 B; 137/68.1, 72, 74

[56] References Cited

U.S. PATENT DOCUMENTS

| | | | |
|---|---|---|---|
| 47,076 | 3/1865 | Smith | 137/74 X |
| 195,367 | 9/1877 | Hiller | 137/74 X |
| 2,133,461 | 10/1938 | McAbee | 220/89 A |
| 2,356,283 | 8/1944 | Steins | 220/89 B |
| 2,580,426 | 1/1952 | Heigis | 220/89 A X |
| 2,743,036 | 4/1956 | Wachtell | 220/89 B |
| 4,085,860 | 4/1978 | Hawkins | 220/89 B |
| 4,352,365 | 10/1982 | Boccardo | 220/89 A X |

FOREIGN PATENT DOCUMENTS 504257 4/1939 United Kingdom ................ 137/72
715109 9/1954 United Kingdom ................ 137/72

Primary Examiner—Harold W. Weakley
Attorney, Agent, or Firm—Thomas J. Connelly

[57] ABSTRACT

A combination thermal or pressure activated relief valve is disclosed. The valve includes a housing having an inlet and an outlet formed therein. The inlet is adapted to be attached to a pressure source while the outlet is in communication with an area having a lower pressure value than said pressure source. An insert is secured in the outlet and includes a stem having a first passage formed therethrough and a helical groove formed about its outer periphery. The groove cooperates with the housing to form a helical passageway between the inlet and the outlet. A fusible material is inserted into the helical passageway and normally blocks fluid flow therethrough and is fusible at a selected temperature to permit fluid flow therethrough. A second member is secured to the insert and has a passage formed therethrough which communicates with the first passage formed in the insert. A pressure responsive lamina is positioned across the passage for normally blocking fluid flow therethrough. The lamina is rupturable in response to a selected pressure arising at the pressure source so as to permit pressurized fluid to be released to the lower pressure area.

13 Claims, 1 Drawing Sheet

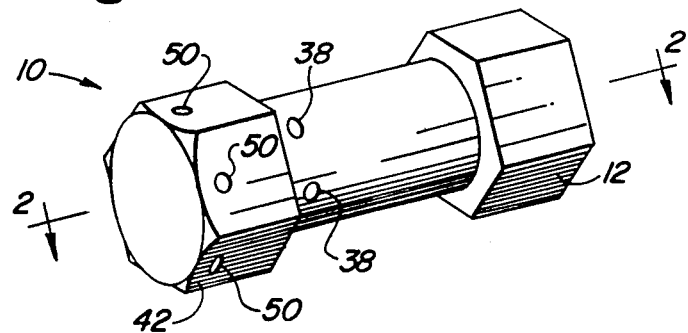
Fig. 1
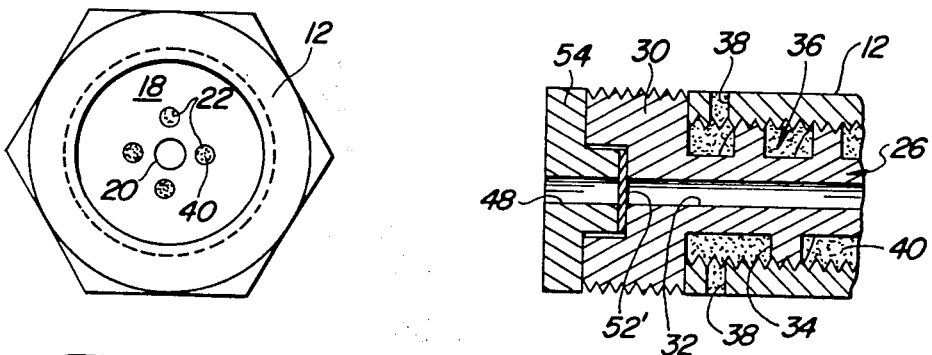
Fig. 2
Fig. 3
Fig. 4

COMBINATION THERMAL OR PRESSURE ACTIVATED RELIEF VALVE

FIELD OF THE INVENTION

This invention relates to a combination thermal or pressure activated relief valve for use on a pressurized cylinder so as to prevent a catastrophic rupture.

BACKGROUND OF THE INVENTION

It is common to employ a relief valve on a pressurized cylinder so as to prevent premature rupture should the internal pressure become excessive. With the use of new lightweight material to form pressurized cylinders, the industry has experienced a new problem. Lightweight materials such as aluminum, Kevlar and plastic tend to lose strength at elevated temperatures and, if stressed, stretch and deform so that the wall thickness eventually becomes thinner. In such cases, the safety value of the cylinder is reduced and a catastrophic rupture could prematurely occur.

It can also be appreciated that a relief valve which opens at a certain pressure value gives some protection against overheating of the cylinder itself. However, under certain conditions, such as a partially filled cylinder or a cylinder made from a material which undergoes a relatively rapid decay in its tensile strength or other physical properties with increasing temperature, a pressure responsive valve may not be sufficient to relieve the pressure before the stresses induced in the cylinder exceed the recommended value. Because of this, it is advantageous to employ a relief valve which has both a temperature and pressure sensing mechanism which are independent of each other.

There are a number of patents directed to relief valves. These include U.S. Pat. Nos. 4,407,432; 4,352,365; 4,059,125; 3,472,427; and 2,040,776. Of these patents, the U.S. Pat. No. 4,352,365, issued to Boccardo et al, addresses the issue of providing both a temperature and pressure activated relief valve. However, Boccardo discloses a valve which uses a common outlet for releasing the pressurized fluid, while the present invention provides for two separate passageways which can allow for quicker venting.

Now a combination thermal or pressure activated relief valve has been invented which can release a fluid or a gas from a pressurized cylinder should its internal pressures exceed a predetermined value or should the cylinder itself become exposed to excessively high temperatures.

SUMMARY OF THE INVENTION

Briefly, the present invention relates to a combination thermal or pressure activated relief valve for use on a pressurized container. The valve includes a housing having an inlet and an outlet portion separated by a wall. The wall is provided with a central passageway and at least two radially offset passageways which connect the inlet to the outlet by fluid communication. The inlet side of the housing is adapted to be attached to a pressure source such as a pressurized cylinder while the outlet communicates with the atmosphere or with an area having a lower pressure than said pressure source. An insert is secured in the outlet and has a central passage formed therethrough which is axially aligned with the central passage formed in the housing. The insert also has a helical groove formed in its outer periphery which cooperates with the housing to form a helical passageway which fluidly communicates with the offset passageways formed in the housing. A fusible material is inserted into the helical passageway and normally blocks fluid flow therethrough while being fusible at a selected temperature to permit fluid flow from the pressure source to the lower pressure area. The helical passageway provides a separate independent passage for relieving pressure within the pressurized container when the material of which the container is constructed is subjected to an excessive rise in temperature.

The valve also includes a second member which is secured to the insert and has a passage formed therethrough. The passage can be axially aligned with the central passage formed in the insert and provides fluid communication between the pressurized container and an area of lower pressure, such as the atmosphere. A pressure responsive lamina is positioned across the passage of the second member to normally block fluid flow therethrough and is designed to be rupturable in response to a selected pressure arising inside the container to permit the pressure to be released. The passage formed in the second member provides an independent passage to relieve excessive pressure from the container should the internal pressure within the container exceed a predetermined limit.

A general object of this invention is to provide a combination thermal or pressure activated relief valve, each activation being independent of the other. A more specific object of this invention is to provide a combination thermal or pressure activated relief valve for fitment to a pressurized cylinder constructed of a lightweight material.

Another object of this invention is to provide a relatively simple thermal or pressure activated relief valve which is economical to manufacture.

Still further, an object of this invention is to provide a combination thermal or pressure activated relief valve which is designed to avoid a catastrophic rupture of new lightweight pressurized cylinders such as those constructed of aluminum, Kevlar or plastic.

Still another object of this invention is to provide a thermal or pressure activated relief valve which uses a unique helical passageway filled with a fusible material which delays extrusion of the fusible material thereby extending the service life of the valve.

Other objects and advantages of the present invention will become more apparent to those skilled in the art in view of the following description and the accompanying drawings.

BRIEF DESCRIPTION OF THE DRAWINGS

FIG. 1 is a perspective view of a combination thermal or pressure activated relief valve.

FIG. 2 is a cross-sectional view of the thermal or pressure activated relief valve shown in FIG. 1 taken along the line 2—2.

FIG. 3 is an end view of FIG. 2 taken along the line 3—3.

FIG. 4 is a partial cross-sectional view of an alternative embodiment of the combination thermal or pressure activated relief valve showing a pressure responsive lamina being an integral part of the cap.

DETAILED DESCRIPTION OF THE PREFERRED EMBODIMENTS

Referring to FIGS. 1 and 2, a combination thermal or pressure activated relief valve 10 is shown. The relief valve 10 includes a housing or body 12 which can be constructed of an easily machinable material such as brass. The housing 12 has an inlet 14 and an outlet 16 formed therein which are separated by a wall 18. The wall 18 contains a central passageway 20 which is surrounded by at least one and preferably two or more radially offset passageways 22. FIG. 3 shows four passageways 22 formed in the wall 18. The purpose of the passages 20 and 22 will be explained below.

The inlet 14 is shown having an internal thread 24 formed about its inner periphery. The thread 24 provides a means of attachment to a pressure source, for example, a pressurized cylinder (not shown). It should be noted that the inlet 14 can be fastened to the pressurized cylinder by other known means as well. The outlet 16 communicates with the atmosphere or with an area having a lower pressure value than said pressure source.

An insert 26 is secured in the outlet 16. The insert 26 includes an elongated threaded stem 28 having a head 30, preferably an enlarged head, formed on one end and a central passage 32 formed completely therethrough. The central passage 32 communicates with and preferably is in axial alignment with the central passage 20 formed in the housing 12. The passages 20 and 32 can have the same cross-sectional diameter and configuration if desired so as to facilitate fluid flow. The term "fluid flow", as used throughout this application, refers to pressurized liquid, gas or powder substances which may be contained within a pressure vessel.

The stem 28 has a helical groove 34 formed in its outer periphery which cooperates with the housing 12 to form a helical passageway 36 which fluidly communicates with the offset passageways 22 formed in the wall 18. It is also possible to form the helical passageway 36 in a solid housing and avoid the use of the insert 26. In such a case, the housing and passageway can be cast formed.

For ease of manufacture, the offset passageways 22 should be in axial alignment with the end of the helical passageway 36 and each one should have a smaller cross-sectional area than the helical passageway 36. More preferably, the combined total cross-sectional area of all of the passageways 22 will be less than or equal to the cross-sectional area of the helical passageway 36. The housing 12 is provided with at least one and preferably two or more outlet ports 38 which are aligned perpendicularly to the helical passageway 36. The outlet ports 38 should have a cross-sectional area which is less than or equal to the cross-sectional area of the helical passageway 36. The reason for this will be explained below.

A molten fusible material 40 is inserted into the helical passageway 36 and also occupies the passageways 22 and 38 formed in the housing 12. The fusible material 40 normally blocks fluid flow through the helical passageway 36 while being fusible at a selected temperature to permit fluid flow from the pressure source to the lower pressure area. The fusible material 40, which can be white lead or a eutectic alloy, can have a melting temperature which coincides with its freezing temperature. The fusible material 40 will have a melting point in the range of between 150° and 300° F., preferably between 200° and 230° F., with a temperature of 212° or 217° F. being optimum. Such fusible material 40 is available from Cerro Metal Products, a division of The Marmon Group, Inc., P.O. Box 388, Bellefonte, Pa. 16823.

Presently, the life of a pressure valve using a fusible material 40 is shortened by the fact that the fusible material 40 tends to extrude out of its passageway over a period of time because of the internal pressure acting upon it. Experimentation has shown that by making the offset passageways 22 and the outlet ports 38 of a small cross-sectional area, the time period over which extrusion takes place can be extended. The reason for this is that even though the pressure acting against the fusible material 40 is the same regardless of the cross-sectional size of the passageway 22, by using a plurality of smaller openings, one can reduce the absolute force exerted on the fusible material 40. By reducing the force acting on the fusible material 40, it has been found that it will take a longer period of time to extrude the material 40 from the passageway 22. Experimentation has further proved that the helical passageway 36 provides increased resistance to extrusion. This resistance can also be increased by roughening the surface such as by chemical etching or by using a coating so as to create more resistance.

As noted earlier, the helical passageway 36 is perpendicularly aligned to the outlet ports 38 such that the fusible material 40 has to make a right angle turn in order to be extruded. This right angle turn, in addition to the fact that the ports 38 have a smaller cross-sectional area than the helical passageway 36, tends to increase the forced shear deformation which the fusible material 40 must experience in order to be displaced outward. Experimentation has shown that when the fusible material 40 exhibits forced shear deformation against itself that it will take a longer period of time before it will extrude. This design can substantially add months and in some instances years to the useful life of a relief valve.

The thermal or pressure activated relief valve 10 further includes a cap 42 which is adapted to be secured to the insert 26. As shown in FIG. 2, the cap 42 includes a threaded bore 44 which engages a helical thread 46 formed on the exterior of the head 30. The cap 42 has a central passage 48 formed therethrough which is in axial alignment with the central passages 32 and 20 formed in the insert 26 and the housing 12, respectively. Preferably, the central passage 48 will have a cross-sectional area at least equal to and preferably greater than the cross-sectional area of the passage 32. The central passage 48 cooperates with the passages 20 and 32 to provide fluid communication between the pressure source and the lower pressure area. Should the pressure within the cylinder rise above a predetermined value, the pressure will be able to be relieved or vented through the opening formed by the passages 20, 32 and 48. Since the thermal or pressure activated relief valve 10 is designed to be attached to a pressurized cylinder, it is advantageous to disperse the pressurized fluid in a radially outward manner so as to prevent the force of the relieving substance from knocking over the pressurized cylinder. In this regard, it is advantageous to utilize at least two and preferably a plurality of radially aligned passages 50 which are formed in the cap 42. The passages 50 enable the vented pressure to be dispersed in a number of different or opposite directions.

A pressure responsive lamina 52 is positioned across the central passageway 48 and serves to normally block fluid flow therethrough while being rupturable in response to a selected pressure arising inside the cylinder to permit fluid flow through the passageway 48. Such rupturable discs are commercially available from Superior Valve Company of Washington, Pa. Normally, the lamina 52 is constructed of a metal alloy such as rolled nickel, nickel-copper or Inconel. The pressure responsive lamina 52 can be a separate member as shown in FIG. 2 or it can be an integral member 52' formed with a cap 54 as is shown in FIG. 4.

A washer 56, preferably made of copper, brass or some other malleable material, is positioned between the insert 26 and the pressure responsive lamina 52 to provide a seal therebetween. In safety relief valves, it is important that leakage be prevented between adjoining parts for it could adversely affect the operation of the valve itself. In the alternative embodiment of FIG. 4 the disc can be sealed in place without a washer and this can be accomplished by precisely machining the interconnecting parts or by using an adhesive.

Referring again to FIG. 2, a gasket 58 is also utilized between the housing 12 and the insert 26 at the junction of the wall 18. The gasket 58 is in the form of a ring with a central opening to allow fluid flow through the central passages 20 and 32 while preventing pressure leakage from the central passage 20 into either the offset passageway 22 or the helical passageway 36. By providing independent passages for venting the pressure, should either a temperature or pressure rise occur, the valve 10 has the unique feature of providing visible evidence at a later time of which type of problem occurred. For example, should the pressurized cylinder have been exposed to a very high heat condition, the fusible material 40 would extrude out and the pressure would escape through the helical passageway 36. At a later time, an operator inspecting the cylinder and the valve 10 could quickly determine that it was heat which caused the venting and not excessive pressure. The independent passageways further facilitate venting in a situation such as a fire wherein both the temperature of the cylinder as well as the internal pressure would cause their respective passageways to open. The use of two independent passageways will assist in venting the substance more quickly and thereby minimize, if not eliminate, the chance of a catastrophic rupture of the pressurized cylinder.

Once again referring to FIG. 2, the insert 26 can contain an outer surface 60 with a seat 62 formed thereon which will serve to sandwich the washer 56 against the pressure responsive lamina 52. The seat 62 cooperates with the washer 56 to assure that an adequate sealing surface occurs. The seat 62 can also reduce the cost of manufacturing the valve 10 because it eliminates the need to maintain critical tolerances between two mating surfaces.

While the invention has been described in conjunction with two specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A combination thermal or pressure activated relief valve comprising:
   (a) a body having an inlet adapted to be attached to a pressure source, an internally threaded bore fluidly communicating with said inlet and at least one outlet port formed through said body which connects said threaded bore to an area having a lower pressure value than said pressure source;
   (b) an insert having a threaded stem with an enalarged head formed on an end thereof and having a first passage formed therethrough which fluidly communicates with said inlet, said stem being threadably secured to said bore with said enlarged head preventing said insert from completely entering said bore, said stem further having a groove formed in its outer periphery, the bottom of said groove extending below the root of said thread, said groove extending between said inlet and said outlet port to form a second passage through said valve when said insert is secured in said bore;
   (c) material means for normally blocking fluid flow through said second passage and being fusible at a selected temperature to permit fluid flow from said pressure source to said lower pressure area;
   (d) a cap secured to said insert having at least two ports formed therethrough which intersect said first passage to provide fluid communication between said pressure source and said lower pressure area; and
   (e) means for normally blocking fluid flow through said first passage, said means being rupturable in response to a selected pressure arising at said pressure source to permit fluid flow through said first passage to said lower pressure area.

2. The relief valve of claim 1 wherein said body includes a wall formed between said inlet and said threaded bore, said wall having a first aperture formed therethrough which communicates with said first passage and one or more second apertures formed therethrough which communicate with said second passage.

3. The relief valve of claim 2 wherein said first aperture has a cross-sectional area approximately equal to the cross-sectional area of said first passage and each of said second apertures has a cross-sectional area which is less than the cross-sectional area of said second passage thereby reducing the absolute pressure force acting on said material means.

4. The relief valve of claim 1 wherein said outlet port is perpendicularly aligned to said second passage.

5. The relief valve of claim 2 wherein said outlet port has a smaller cross-sectional area than said second passage which causes said material means to be subjected to forced shear deformation against itself during removal.

6. The relief valve of claim 1 wherein said second passage is axially aligned with said first passage.

7. A combination thermal or pressure activated relief valve comprising:
   (a) a body having an inlet and a threaded bore formed therein which are separated by a wall having a central aperture and at least two radially offset apertures formed therethrough, and at least one outlet port formed through said body which intersects said threaded bore, said inlet adapted to be attached to a pressure source and said outlet port adapted to be in fluid communication with an area having a lower pressure value than said pressure source;
   (b) an insert having a threaded stem with an enlarged head formed on an end thereof and having a first passage formed therethrough which is aligned with said central aperture to provide fluid communication with said inlet, said stem being threadably secured to said bore with said enlarged head preventing said insert from completely entering said bore, said stem further having a groove formed in its outer periphery, the bottom of said groove extending below the root of said thread, said groove extending between said two radially offset apertures and said outlet port to form a second passage through said valve when said insert is secured in said bore;

(c) material means for normally blocking fluid flow through said second passage and being fusible at a selected temperature to permit fluid flow from said pressure source to said lower pressure area;

(d) a second member secured to said insert having at least one outlet port formed therethrough which intersects said first passage to provide fluid communication between said pressure source and said lower pressure area; and (e) a pressure responsive lamina positioned across said first passage to normally block fluid flow therethrough and being rupturable in response to a preselected pressure value arising at said pressure source to permit fluid flow through said first passage to said lower pressure area.

8. The relief valve of claim 7 wherein a seal is positioned between said insert and said lamina to essentially eliminate leakage therebetween.

9. The relief valve of claim 7 wherein there are at least two outlet ports perpendicularly aligned with said second passage, each outlet port having a smaller cross-sectional area than said second passage whereby said material means is subjected to forced shear deformation against itself during removal.

10. The relief valve of claim 7 wherein there are four offset apertures formed in said wall, each having a cross-sectional area smaller than the cross-sectional area of said second passage thereby reducing the absolute pressure force acting on said material means.

11. The relief valve of claim 7 wherein a circular gasket having a central opening is positioned between said body and said insert, said gasket preventing leakage between said first and said second passages without obstructing fluid flow through said first passage.

12. The relief valve of claim 7 wherein said pressure responsive lamina is integrally formed with said second member.

13. A combination thermal or pressure activated relief valve comprising:

(a) a body having an inlet and a threaded bore formed therein which are separated by a wall having a central aperture and a plurality of radially offset apertures formed therethrough, and at least one outlet port formed through said body which intersects said threaded bore, said inlet adapted to be attached to a pressurized vessel and said outlet port adapted to be in fluid communication with an area having a lower pressure value than said pressurized vessel;

(b) an insert having a threaded stem with an enlarged head formed on an end thereof and having a first passage formed therethrough which is aligned with said central aperture to provide fluid communication with said inlet, said stem being threadably secured to said bore with said enlarged head preventing said insert from completely entering said bore, said stem further having a helical groove formed in its outer periphery, the bottom of said groove extending below the root of said thread, said helical groove extending between said radially offset apertures and said outlet port to form a second passage through said valve when said insert is secured in said bore;

(c) material means for normally blocking fluid flow through said second passage and being fusible at a selected temperature to permit fluid flow from said pressurized vessel to said lower pressure area;

(d) a cap secured to said insert having two outlet ports formed therethrough which intersect said first passage to provide fluid communication between said pressurized vessel and said lower pressure area;

(e) a pressure responsive lamina positioned across said first passage to normally block fluid flow threthrough and being rupturable in response to a preselected pressure value arising inside said pressurized vessel to permit fluid flow through said first passage to said lower pressure area; and (f) a seal positioned between said insert and said lamina to essentially elimnate leakage therebetween.

* * * * *